United States Patent
Zettner

(10) Patent No.: US 6,555,727 B2
(45) Date of Patent: Apr. 29, 2003

(54) FLUID COMPOUND THERMOCHEMICAL CONVERSION PROCESS AND CONVERTER

(76) Inventor: Michael L. Zettner, 88 Marc Shagall Street, IL-Ashdod 77663 (IL)

(*) Notice: Subject to any disclaimer, the term of this patent is extended or adjusted under 35 U.S.C. 154(b) by 0 days.

(21) Appl. No.: 09/767,829

(22) Filed: Jan. 24, 2001

(65) Prior Publication Data

US 2001/0029312 A1 Oct. 11, 2001

Related U.S. Application Data

(63) Continuation-in-part of application No. 09/480,174, filed on Jan. 10, 2000, now abandoned, which is a continuation-in-part of application No. 08/913,633, filed on Jan. 8, 1998, now abandoned.

(30) Foreign Application Priority Data

Mar. 20, 1995 (WO) ................................ PCT/EP95/01031

(51) Int. Cl.[7] ................................................. F23G 5/44
(52) U.S. Cl. ..................... 588/205; 588/207; 588/212; 588/219; 588/227; 588/243; 588/247; 422/188
(58) Field of Search ................................ 588/212, 227, 588/219, 243, 247, 205, 207, 900; 423/DIG. 10; 431/8, 10, 174, 175, 176, 285; 585/921, 923, 648; 422/188

(56) References Cited

U.S. PATENT DOCUMENTS

| | | |
|---|---|---|
| 2,934,410 A | 4/1960 | Smith |
| 3,098,883 A | 7/1963 | Heuse et al. |
| 3,586,732 A | 6/1971 | Guth et al. |
| 3,985,494 A | 10/1976 | Childree ............... 431/175 |
| 4,007,002 A | 2/1977 | Schirmer ............... 431/10 |
| 5,174,983 A | 12/1992 | Snail ............... 423/446 |

FOREIGN PATENT DOCUMENTS

| | | |
|---|---|---|
| DE | 29 42 962 A1 | 7/1981 |
| FR | 2468070 | 10/1979 |
| GB | 1387730 | 3/1975 |
| WO | WO 80/00741 | 4/1980 |

OTHER PUBLICATIONS

Chemical Engineers' Handbook; Perry; Editor; McGraw-Hill Book Company, 1950.

Primary Examiner—Stanley S. Silverman
Assistant Examiner—Maribel Medina
(74) Attorney, Agent, or Firm—Sughrue Mion, PLLC

(57) ABSTRACT

In a two-step method of chemothermal conversion of feedstock in the form of fluid compounds or compounds convertible into a fluid state, into low-molecular, organic or inorganic compounds, the improvement including reaching an extremely high efficiency rate of the destruction of the compounds of the second preliminary step by introducing the compounds of the first preliminary step through at least one small mixing channel under excess pressure of between 1.5 atmospheres and 150 atmospheres, so that the start of the exothermic reaction is delayed until the compounds reach the main reaction chamber, wherein, due to the excess pressure, the compounds react very quickly in an explosion-like manner, thereby reaching a high temperature and high density of heat radiation immediately usable for the destruction of the molecular structure of the compounds of the second preliminary step, and introducing the compounds of the second preliminary step simultaneously with the compounds of the first preliminary step at the downstream end of the mixing channels of the first preliminary step where the exothermic reaction takes place, thus enabling the transfer of energy from the exothermic reaction of the compounds of the first preliminary step at a highest possible temperature and heat radiation level to the compounds of the second preliminary step.

12 Claims, 6 Drawing Sheets

FLUID COMPOUND THERMOCHEMICAL CONVERSION PROCESS AND CONVERTER

This is a Continuation-in-Part of application No. 09/480,174 filed Jan. 10, 2000 (now abandoned), which in turn is a Continuation-in-Part of application No. 08/913,633, filed Jan. 8, 1998 (now abandoned).

FIELD OF THE INVENTION

The present invention relates to a method for the chemo-thermal conversion of fluid compounds or compounds which are convertible into a fluid state, and to a converter for the performance of the method.

BACKGROUND OF THE INVENTION

The protection of the environment gains more and more importance, and correspondingly, emission restrictions are becoming stricter and stricter. Incineration and other thermal processes are still the most common ways of eliminating waste or substances by means of thermal destruction. The efficiency rate of thermal destruction has therefore to become much higher, in order to meet the new demands.

As an example, according to the very common German regulation, not more than 1.5 nanogram of dioxins per $m^3$ is allowed as an average emission. In order to meet this regulation, thermal destruction has to have an efficiency rate of at least 99.9999985%. A maximum of 0.0000015% of the compounds is allowed to be incompletely destroyed in order to reach such a high efficiency rate.

At the same time, it is not only necessary to reach such a high rate of efficiency, but also, in order to open all of the molecular bonds, a high temperature is necessary. For example, fluoro-chloro-hydrocarbons are extremely temperature stable, and require a temperature higher than 1,900° to be cracked. To reach this aim, very often a temperature is chosen that can open all molecular bonds. The molecular structures are then replaced by an ionic structure or form called "plasma." Such a structure can also be a mixture wherein some of the molecules are already in an ionic form and other, more stable molecular structures are still intact. In such an event, the structure will be called a "plasma-like structure" or form.

The highest temperature level or temperature is required for the initial opening of the molecular bonds, and must be achieved first.

To reach the required efficiency rate, the temperature has to be distributed in such as way that there is no colder zone where molecules could pass through without being cracked into atoms. Thus, a flame geometry ensuring sufficient heat distribution is also essential to obtaining a high efficiency rate.

In order to achieve efficient thermal destruction at an industrial scale and not just in a laboratory device, these three tasks: high efficiency rate, sufficient heat distribution, and sufficient high temperature, must be realized at reasonable cost.

There are certain physical phenomena and effects that limit reaction possibilities in burners, burner systems, or similar systems and devices. An exothermic chemical reaction creates a certain amount of energy. This energy is set free with the chemical reaction and at the location of the reaction. The energy leads to a specific temperature, depending upon the volume, mass, and distance to the point of the chemical reaction. The closer to the point of reaction, the higher is the temperature. The largest part of the energy is released in the form of radiation, especially infrared radiation, spreading from the point where the chemical reaction takes place. The temperature, as a function of the heat, can also be connected to this radiation. Thus, the temperature decreases exponentially with the exponential increase of the spherical surface of distribution of the heat radiation.

Only a complete exothermic chemical reaction leads to a complete conversion of the compounds. If other compounds or, for example, a feedstock, interferes with the exothermic chemical reaction, then part of the exothermic reaction will not take place. Normally, in a continuous exothermic reaction, a molecule or molecules which have just been converted in the exothermic reaction or have reacted, will send energy to the following molecules of the continuous exothermic reaction partner and will initiate or ignite another reaction. If the other compounds are mixed with the main one, the main reaction will be incomplete and/or insufficient. A feedstock might shield and partly interrupt the exothermic reaction. In such a case, the requested and targeted efficiency rate of 99.9999985% cannot be achieved.

Consequently, the exothermic chemical reaction and the feeding of the compound to be destroyed have to be carried out at different places or times. First, the exothermic chemical reaction must be completed, and only then the next compound that is in need of the exothermic energy may be added.

Burner systems intended to destroy compounds by means of an exothermic chemical reaction therefore feed the first compound to be destroyed after the first exothermic reaction, and afterwards feed the second compound or mixture of compounds. In this way, the reactions are completed by the various burner systems and the presence of residues of the basic reaction in their flue gases is avoided.

It can be seen in prior art references that it is an acknowledged necessity to complete the first exothermic reaction before further compounds or feedstock are introduced for thermal destruction. It is not important whether the thermal destruction is for the purpose of destroying substances or compounds, or whether it is intended to create new ones and the destruction of a molecular structure is only a necessary step of a more complex reaction or series of reactions.

In the drawings of U.S. Pat. No. 2,934,410 (G. H. Smith), it can clearly be seen that the two-zone burner is divided into an upper area wherein the exothermic reaction takes place and is completed, and a lower, secondary area wherein the stock or further compounds are fed into the burner.

The earlier U.S. Pat. No. 3,098,883 (O. Heuse), describes and shows that the reaction has a first, exothermic portion divided into several parts, which is followed by a second, also divided, step wherein the provided energy is used to open molecular bonds. In the case of the patent to Heuse, the energy is intended to create or produce new substances with the aid of the energy released at a high temperature from the primary reaction step. This patent also describes the need for short flames, in order not to cause a decrease of temperature by losing much of the energy.

A short flame is short because the exothermic reaction inside the flame is fast. Heuse also indicated that the exothermic reaction first has to be completely terminated before the secondary step is started. This is also clear from the drawings, wherein it can be seen that the first exothermic reaction takes place at a separate portion of the apparatus, and especially from the technical detail that the fuel and oxidizing gas are introduced separately into the apparatus. The apparatus of Heuse, therefore, also requires allowing the compounds of the exothermic reaction to react in the first portion, and only then adding the next compound in the further portion. The difference with respect to the more basic concept of Smith is that Smith divides the stream of introduced gases into several smaller streams, together with the option of giving these streams a spin to produce additional kinetic energy and introducing these gases tangentially, creating a rotation that assists in mixing the combustion gases of the first exothermic reaction with the compounds of, or for, the secondary reaction.

Both of these prior art U.S. patents clearly show a burner device and procedure having two steps following each other, involving a first, exothermic reaction followed by a secondary reaction. Overlapping of these reactions is not intended. Most known burners and burner devices use this principle.

In U.S. Pat. No. 4,007,002 (Robert M. Schirmer), describing combustors and methods of their operation, the same principle is used. A first reaction is completed and is even covered by an inner housing, in order to avoid contact of the gases of the first reaction with the compounds of the second reaction before the first reaction is completed.

Conventional burners and similar devices that use an exothermic reaction to gain energy have in common that they, by different means, complete the preliminary exothermic reaction first before they begin the next step, either destruction of the molecules, production of hot combustion gases, or any other purpose they may have. In order to reach high temperatures for the second reaction, all of these devices have a consequent disadvantage in that they cannot utilize a substantial portion of the energy created in the first step.

When the exothermic first reaction takes place, energy is released. This energy is, as described above, partly released in the form of body heat: the molecules of the combustion gases or products that were created in the exothermic reaction have a higher temperature. The largest part of the energy is released in the form of radiation, mainly infrared radiation, going out from the location of the reaction and radiating in a spherical form. When the distance to the location where the infrared radiation is created is longer, there is a lower temperature, due to the larger volume of space that is covered. With linear increase of the distance (the radius of the spherical radiation), the surfaces increase exponentially, as well as the volume. In this manner, the temperature gained from the radiation from the first exothermic reaction decreases exponentially with the distance to the location of the reaction.

In the case of a burner or apparatus like that described by Smith, more than 80% of the total energy that has been created in the first step, the exothermic reaction, cannot be used in the secondary step where further compounds are added. Only the small section of the spherical heat radiation which overlaps with the surface of the cross-section of the entrance to the second chamber can be used. All the rest of the energy is lost for the secondary reaction. Hence, the temperature that can be reached with the specific amount of energy introduced into the system by the compounds of the first exothermic reaction is much lower than it could theoretically be.

Another side effect is that because the secondary reaction takes place at a location away from the hottest point, the secondary reaction cannot be as complete as it would be at a higher temperature close to the first exothermic reaction. The system therefore might also not reach the required efficiency rate of 99.9999985%. In a case where insufficient burner systems are used, in order to reach the required efficiency rate, a secondary burner system, called an "afterburner," is added. Secondary or after-burner systems also require fuel and control, and lead to an increase in investment and operating costs. In addition, they produce a higher output of carbon dioxide, which should be avoided.

DISCLOSURE OF THE INVENTION

The object of the present invention is to provide a burner system that allows a continuous, high temperature, exothermic reaction using the heat radiation at the highest possible temperature without interrupting or disturbing the exothermic chemical reaction.

The present invention provides a system that, with one burner, can reach the necessary high temperature and required efficiency rate. In several independently documented tests, it has been shown that the system of the present invention is able to reach an efficiency rate of 99.99999987% (ten times better than required) in a single step. The system of the invention is operable on an industrial scale.

The present invention achieves the above objects by providing, in a method of chemothermal conversion of feedstock in the form of fluid compounds or compounds convertible into a fluid state, into low-molecular, organic or inorganic compounds, said method comprising at least one first, preliminary step in which reaction compounds under excess pressure are caused to flow through a first mixing channel having a reduced flow cross-section, in which said compounds are completely intermixed to form an exothermic first mixture but are unable to inter-react within said first mixing channel; at least one simultaneous, second preliminary step in which said feedstock, either alone or in a mixture with one or more other substances under excess pressure, is caused to flow through a second mixing channel having a reduced flow cross-section, in which said compounds are completely intermixed to form a second mixture but are unable to inter-react within said second mixing channel; wherein compounds of said first preliminary step, downstream of said first mixing channel, and after reduction in flow speed produced by an increase in flow cross-section, flow into a reaction chamber, and perform an exothermic reaction with each other, still under excess pressure, at a very high reaction speed and very high energy density, dependent on said excess pressure, thereby creating a field of high temperature and heat radiation; wherein compounds of said second preliminary step, downstream of said second mixing channel, and after reduction in flow speed produced by an increase in flow cross-section, flow into the same reaction chamber, and wherein the compounds of said second preliminary step then receive sufficient energy from the exothermic reaction of the compounds of the first preliminary step to react in such a way that the molecular structure of the compounds of said second preliminary step is completely destroyed; the improvement comprising reaching an extremely high efficiency rate of the destruction of the compounds of the second preliminary step by introducing the compounds of said first preliminary step through at least one small mixing channel under excess pressure of between 1.5 atmospheres and 150 atmospheres, so that the start of the exothermic reaction is delayed until the compounds reach said main reaction chamber, wherein, due to the excess pressure, the compounds react very quickly in an explosion-like manner, thereby reaching a high temperature and high density of heat radiation immediately usable for the destruction of the molecular structure of the compounds of said second preliminary step, and introducing the compounds of said second preliminary step simultaneously with the compounds of said first preliminary step at the downstream end of the mixing channels of said first preliminary step where said exothermic reaction takes place, thus enabling the transfer of energy from the exothermic reaction of the compounds of said first preliminary step at a highest possible temperature and heat radiation level to the compounds of said second preliminary step.

The invention further provides a converter for the chemothermal conversion of feedstock, said converter comprising a main reaction chamber with an exit nozzle for reaction products; at least one first charging unit for feeding a first gas mixture into said reaction chamber and at least one second charging unit for feeding a second gas mixture into said main reaction chamber, each said charging unit comprising means defining a plurality of feed ducts for the separate feeding of components of each respective mixture, and means defining a mixing channel connected with said main reaction chamber, said mixing channel serving as a mixing region for formation of a mixture of said feed components, the flow cross-section of said channel being selected to be so reduced in size that the speed of flow of the mixture in the mixing channel is greater than the speed of propagation of any reaction front of the components of the mixture therein, whereby flashback from said reaction chamber is prevented.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a view of the converter with a vertical rectangular cut-out;

FIG. 2 shows a section through a charging unit;

FIG. 3 shows the converter according to FIG. 1 with preheating channels;

FIG. 4 shows a vertical section through two charging units;

FIG. 5 shows an enlarged illustration of two charging units according to the cut-out of FIG. 1, and FIG. 6 shows the converter according to FIG. 3 with a pilot device.

DETAILED DESCRIPTION

Figure 1:
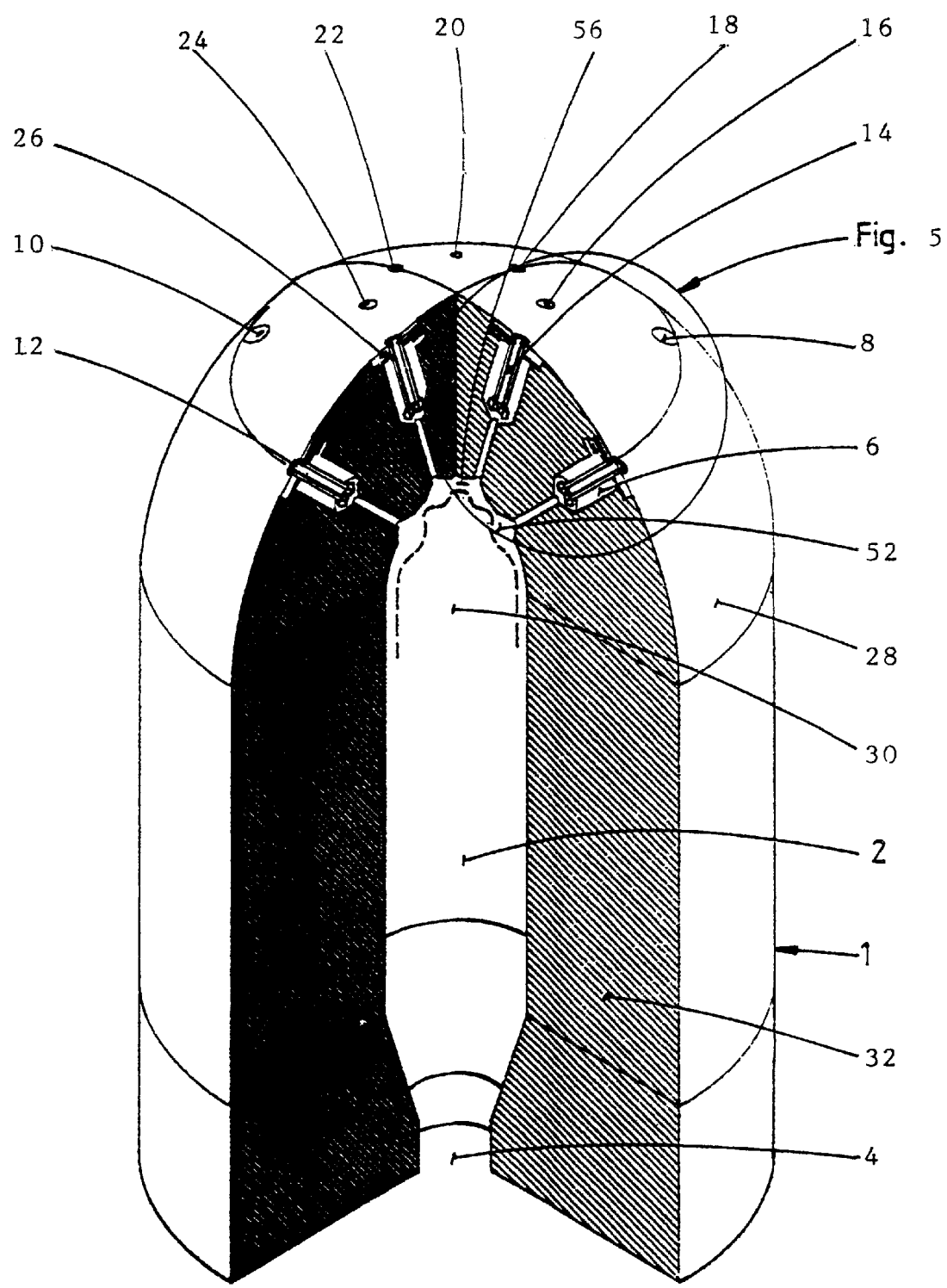

The invention is usable for all fluid substances, or substances convertible into a fluid state. In particular, suspensions and aerosols with finely distributed liquids (mist) or solid particles (smoke, dust), also belong to this category.

Initially, the relationships between excess pressure, achievable temperature level and the reaction time are to be explained by an example, namely, plasma production from wood as a single energy carrier. Wood burns, when ignited, at a temperature of about 400° C. The heat content of wood amounts to about 15 megajoules per kg; in other words, this quantity of heat is delivered upon combustion of the wood. The time in which this quantity of heat is delivered, is determined by the combustion temperature. In order to allow 1 kg of wood to burn for an hour, 78 kg of air are needed. Without consideration of the heat losses to the outside, 1 kg of wood would burn completely in about 30 minutes, and would deliver to the environment flue gas that is made from the air and the carbon hydrogen from the wood at a temperature of 400° C., as well as heat radiation.

If it should be desired to increase the temperature of the above-described combustion, for example, by the factor of 7, from 400° C. to 2,800° C., then the combustion would have to take place in a correspondingly shortened time, with the same quantities of air and wood. The chemical conversion of the hydrocarbons, thus of the wood, which takes place during the combustion, would have to be completely concluded in a shorter time, due to the fact that heat losses are higher at a higher temperature level, and also due to a different way of reaction, in one-seventh of the original time of 30 minutes, i.e., in 4.2 minutes. If the wood is ground into a fine wood powder, mixed with air and ignited, it will react so fast that it would be said to explode. According to the quantity of the admixed air, during its combustion, the mixture of wood powder and air will set the temperature, resulting from the quantity of heat contained in the wood. For fractions of one second, the high temperature of 2,800° C. would be reached or exceeded, but this temperature would not be lasting.

In the following, there is described a continuous, high temperature process, such as the 2,800° C. during the combustion of wood as energy carrier, mentioned in the above example. Very high temperatures for the conversion of substances of all kinds can thereby be achieved in the desired manner. The energy density of conversion processes, be they combustions, pyrolyses, hydrolyses, or other composition processes, can be controlled and determined by means of the present invention.

The invention proceeds from a combination of two continuously devolving, partial chemical reactions.

In a preliminary method step, the first partial reaction serves to produce freely usable energy, which can be used for the performance of the actual conversion reaction in the main method step. In that case, one, two, or more reaction compounds or partners are conducted under pressure reaching from 1.5 atmospheres to even more than 150 atmospheres, into a charging unit in the preliminary method step. There, the reaction compounds are mixed (mixing phase) in a region through which they flow at a very high speed. The compounds are then conducted through a transition region into a zone through which they flow at a lower speed and in which they react only then with one another. The substance mixture is always under pressure, even in the region or zone flowed through at the lower speed. In consequence of the extremely good intermixing in the mixing region, the reaction compounds obtain a very great reaction surface. Due to the pressure under which the reaction compounds stand, a very high energy density is given. As described above, the exothermic reaction is under pressure and therefore has an exponentially shorter reaction time, and thus has a higher output of energy per volume and time, easily reaching higher temperatures. In addition, the release of heat radiation is under larger access pressure than atmospheric pressure.

If, for example, methane, acetylene and air, or, as in the above example, wood in the form of wood powder and air, are taken as reaction compounds for energy production in the preliminary method step, the mixture immediately reacts completely, at once and almost explosively, upon ignition in the region flowed through at the lower speed. Due to the excess pressure, the energy or quantity of heat becomes free in a smaller volume than would be the case for atmospheric pressure, so that the temperature resulting from the reaction is correspondingly higher.

Due to the very good intermixing of the reacting reaction compounds in the mixing region flowed through at a very high speed, the reaction surface at which a conversion of the reaction compounds takes place, is correspondingly greater. The chemical conversion thereby takes place substantially more rapidly. Thus, the total quantity of heat liberated during the reaction is liberated in a shorter time, whereby the temperature likewise rises. Also, due to the higher temperature and with the directly connected higher concentration of heat radiation, especially infrared radiation, the exothermic reaction is complete and has an efficiency rate higher than 99.999999%.

If one or more of the reaction compounds, such as the air in the above example, is subjected to preliminary heating, the ignitability of the mixture and thereby the reaction speed, are further increased significantly. Thereby, the reaction time is further shortened and the energy becoming free during the reaction is, in addition, liberated in even less time, which in turn contributes to a further rise in temperature, as described above. In the mixing region where the components are mixed and through which they flow at a very high speed, the components are already intermixed completely after a certain distance. The high speed of flow in the mixing region prevents the mixture from igniting, or a flame front or a reaction front from flowing back into the mixing region.

The very high speed of flow of the individual reaction compounds, or of the substance mixture, in the mixing region, must therefore be greater than the speed at which the possible reaction front moves forward. Correspondingly, the speed of flow of the substance mixture must be lower in the reaction region, so as to enable a propagation of the flame front or reaction front. The reaction region, flowed through at a lower speed, is structured so that a substantially lower speed of flow prevails in the forward region adjoining the mixing region, than in the rear or more remote reaction region. Thereby, the first partial reaction will take place in immediate proximity of the transition from the mixing region to the reaction region.

The mixing region is not comparable with the region likewise flowed through at a very high speed, such as is present in gas burners. In the case of a gas burner, the region flowed through at a very high speed also serves for intermixing, but the gases to be intermixed do not both stand under pressure and frequently, they are also not shielded from the environment. No excess pressure can thereby build up, and especially no excess pressure can be built up in the following reaction chamber or room where the exothermic reaction or the intended reaction takes place. However, according to the present invention, the substance mixture is under excess pressure in the mixing region of the charging unit. The excess pressure can be in the amount of from 1.5 to several atmospheres, even up to pressures used in injection systems above 120 atmospheres (for example, in the Bosch-Jettronic system) and is necessary in order that the gas mixture will also have adequate excess pressure in the reaction region through which it flows at a lower speed.

For this purpose, the mixing region must be sealed off in a gas-tight manner against its surroundings, and should also be designed statically for the excess pressure that is present. A high speed of flow, in a given case with turbulence, has substantially different characteristic data at excess pressure than in a system operating almost at atmospheric pressure.

In the second preliminary method step, the second partial reaction takes place parallel with the first partial reaction. The object of the second partial reaction is to intimately intermix the substances, the molecular structure of the compounds which are to be decomposed, with other reaction compounds which enhance or accelerate their decomposition.

The substances whose structure is to be decomposed, are designated herein as "feedstocks." The feedstocks are conducted on their own, or together with one or more conversion substances, for the decomposition or decomposition reaction under pressure, into a charging unit. There, they are mixed in a mixing region flowed through at a very high speed. Similar to the mixing region which is flowed through at a very high speed, the different reaction compounds are also mixed here. The reaction compounds, consisting of feedstock and conversion substance, then pass into the reaction region for the main method in which a lower speed of flow prevails, and there they impinge on the reaction products of the first partial reaction, the exothermic reaction.

As has already been described above, the reaction compounds of the first partial reaction are introduced into the reaction region at a low speed of flow; their chemical reaction takes place within an extremely short time and very high temperatures and very high heat radiation are thereby produced, as described above. The mixture of the second partial reaction is now introduced into the field of very high temperature and very high heat radiation, at the moment when the first mixture is in the exothermic reaction. Due to the intermixing with the reaction products of the first partial reaction not some time after the reaction is completed and also not at a relatively large distance from the first exothermal reaction, a much larger part of the released energy from the exothermic reaction can be transferred, at a very high temperature level, to the second compound or mixture of compounds. Either a second reaction of destruction of the molecular structure of the compounds, or a chemo-thermal composition reaction of the compounds of the secondary partial reaction, now takes place through the additional entry of conversion substances of the second partial reaction. Due to the concept of parallel first and second partial reactions that is possible because of the special design, the concentration of energy, especially of the radiation and the infrared radiation, is still at the highest possible level, providing such energy at a temperature level much higher than that in systems where the secondary partial reactions follow the first, partial, exothermic reaction in respect of time and location.

The reaction compounds of the second partial reaction are in the area where the first, partial, exothermic reaction delivers the most energy and where the heat radiation is still very high, due to the close distance to the point of reaction, and therefore is also still at a very high temperature level. When the molecular bonds of the compounds of the secondary mixture or feedstock start a chemical reaction, or when a breakdown of the molecular structure is started, then mixing with the products of the first partial reaction takes place. The temperature in the following part of the main reaction chamber or housing is still very high, so that the reaction can be completed. The reaction compounds for the second partial reaction are chosen in such a way that they can form an intended new product after the feedstock has reacted and the molecular structure has been destroyed.

During the second partial reaction, which takes place simultaneously with the first partial reaction, it is in some circumstances not so important whether the conversion reaction sets in already in the mixing region, or only in the adjoining region flowed through at a lower speed. Thus, it will be sensible, in almost all cases, to preheat or heat up one or more reaction compounds of the second partial reaction before they pass into the charging units. Thereby, less heat energy is consumed in the reaction region flowed through at a lower speed, and the overall reaction thereby becomes more effective, i.e., it is carried out at a higher efficiency rate.

If the feedstock is known, then the necessary temperature at which the molecular structure of the feedstock is composed completely can be ascertained. Equally, the temperature to be expected can be computed on the basis of the heat energy contained in the reaction compounds of the first partial reaction and the chosen and prevailing pressure. From the temperature, the quantity of heat and the substance data of the feedstock, in particular its energy requirement during the conversion or decomposition reaction, it can be computed what quantity of the reaction compounds of the first partial reaction is necessary, or what quantity of the feedstock can be added, or the optimum quantity ratio thereof relative to one another.

Moreover, it can be predetermined exactly which reaction products will form on leaving the very high temperature region. Their formation results from the reaction compounds which are used for the first and second partial reactions, wherein the substances can be stated qualitatively and quantitatively with small deviations. These deviations lie in the range of about 0.001% to 0.0005%, and refer to the fed quantity of substance of the reaction compounds of the first and second partial reactions, for constantly fed substances.

Due to the division into two separate charges and, at the same time, an enforced very fast exothermic reaction under pressure, a very high reaction stability is achieved. The same stability is reached in other burner systems also by dividing the complete reaction into steps different from those of the present invention. The steps are performed one after the other, the exothermic reaction coming first. The first partial reaction begins directly after the exit from the mixing region. Thus, in the transition region, the geometry of the mixing region so changes that the flow becomes less and a propagation of the flame front or the reaction front is possible. The energy-supplying first partial reaction stabilizes in this relatively small region. This kind of stable reaction cannot use the high amount of infrared radiation at the very high temperature level that only exists in the direct location where the first, partial, exothermic reaction takes place. The radiation is distributed spherically and therefore the temperature resulting from this radiation also decreases exponentially with the distance to the location of the exothermic reaction.

However, the mixing region flowed through at a high speed is, as described above, the prerequisite for the first partial reaction coming to a sudden reaction not in the mixing region, but only in the adjoining reaction region, with the consequent very high temperature leading to a plasma-like state. This separation of the partial reaction is also a prerequisite for the stable and constant production of a plasma-like state in the reaction region, which adjoins the mixing region and is flowed through at a lower speed. As in the case of forced guidance in a mechanical system, a chemical reaction—the first partial reaction—is brought to sudden reaction with constrained delay. Due to this constrainedly controlled chemical reaction, the energy density is varied in the desired manner. The constrained control of the reaction leads to the controllability of the exothermic reaction. This control, together with the design of the present invention's converter, allowing a stable reaction while a parallel, secondary feedstock mixture is introduced as close as possible to the point of highest temperature directly at the location of the first, partial, exothermic reaction, enables the secondary partial reaction to reach much higher efficiency rates, which have been measured by an independent institute to be 99.9999985%.

Due to the splitting-up of the overall reaction into two partial reactions, decomposition rates for the feedstock are achieved with simple effort, which rates are so high that detection of still present, not decomposed, feedstock is no longer possible by the presently known methods of measurement. These high decomposition rates are partially achieved by the addition of conversion substances and their intense intermixing, which are added to the feedstock during the second partial reaction.

The above is clarified in the following example: Methane is admixed to the feedstock tetrafluoromethane, a substance of high thermal stability. The mixing ratio is chosen so that there is a slight excess of hydrogen atoms bound in the methane, in comparison with the fluorine atoms which are bound in the tetrafluoromethane. If this mixture now passes into the reaction region, which adjoins the mixing region and is flowed through at a lower speed and in which correspondingly sufficiently high temperature has been produced by the first partial reaction, then not only does a thermal decomposition take place, but also a chemical reaction. The liberated hydrogen of the methane reacts with the fluorine of the feedstock tetrafluoromethane. The not so thermally stable methane molecules are split in the hot, plasma-like region within a few parts of milliseconds. An additional preheating of the methane and/or of the tetrafluoromethane before charging into the mixing region accelerates this splitting or cracking. The methane liberates hydrogen as a so-called free radical. The liberated radical hydrogen decomposes the tetrafluoromethane in addition to the thermal reaction. Due to the intermixing of the two reaction compounds of the second partial reaction, in the present example, tetrafluoromethane and methane, in the mixing region of the second partial reaction, the greatest possible reaction surface is created between the two reaction compounds as for the first partial reaction. Thereby, a complete reaction between the hydrogen of the methane and the fluorine of the tetrafluoromethane can come about within milliseconds when the mixture enters into the reaction region which adjoins the mixing region and in which the very high temperatures prevail. The fastest and largest amount of energy from the first, partial, exothermic reaction is transferred in the form of infrared radiation into the second mixture and creates, at this concentration or density, such a high temperature that the very stable molecular structure of the tetrafluoromethane is completely opened. In this example, the reaction of destroying the tetrafluoromethane molecules can be completed by forming new molecules, mainly carbon monoxide, due to the higher amount of hydrogen and fluor-hydrogen gas.

The excess pressure under which the reaction takes place accelerates the chemical conversion, since the excess pressure leads to exponential higher reaction speed and releases energy much faster. The reaction speed increases exponentially with pressure, as is known from process technology. Although the above-described reaction between the fluorine and the hydrogen consumes a part of the heat energy freed from the first partial reaction, the plasma-like state is nevertheless maintained constant by the first partial reaction taking place in parallel. The opening of the molecular structure needs the highest level of temperature, as a minimum, 2,000° C. At some distance to the first, partial, exothermic reaction, this temperature cannot be provided. As described above, other burning systems cannot reach such efficiency in destroying stable molecules such as tetrafluoromethane or similar substances, which are known as ozone-killers.

By an appropriate structuring of the converter, in particular, by appropriate arrangement of the different mixing regions, the greatest possible surface between the reactions of the first and second partial reactions is also created in the reaction region flowed through at a lower speed. In the reaction region, the speed of flow is substantially lower than in the mixing region. For that reason, changes in the second partial reaction do not act disadvantageously. The large surface between the reaction products of the first partial reaction, the very hot, plasma-like region with very high heat radiation, and the reaction compounds of the second partial reaction, lead to a rapid heat transfer to the reaction compounds of the second partial reaction.

As described above, the first partial reaction leads to a very hot, plasma-like state at a very high temperature. A very large part of the heat energy becoming free in the plasma-like state is delivered as radiation heat, the transmission of which, as known, takes place at the speed of light. In order to keep this delivered heat at the high temperature level, the volume to which it is delivered must be very small, which is reached partly by keeping the entire reaction under pressure and thereby reducing the total volume.

For the above-described operating sequences, the greatest difficulty consists of correctly structuring the mixing region of the first energy-delivering partial reaction, which is flowed through at a very high speed. It is crucial for the overall reaction that the chemical conversion between the reaction compounds of the first partial reaction does not begin in the mixing region. Thereby, the heat energy becoming free would be delivered over a greater time span and to a greater volume, which would lead to an exponential lowering of the obtained temperature. For that reason, reaction must be prevented precisely in the mixing region, where the preheating, the optimum intermixing and the pressure urge towards immediate reaction.

FIG. 1 shows the converter 1 with a vertical rectangular cut-out, so that the interior construction of the converter is visible. Converter 1 contains a main reaction chamber 2 and an exit nozzle 4 for the reaction products of the main reaction. The charging units 6, 8, 10 and 12 for the first gas mixture and the charging units 14, 16, 18, 20, 22, 24 and 26 for the second gas mixture, are disposed in the head 28 of the converter 1. The respectively indicated numbers of four and seven charging units are to be regarded only as an example, and more or fewer charging units can be present. The above-described main reaction takes place substantially in region 30, indicated in dashed lines. Preferably, the head 28, main body portion 32 and exit nozzle 4 of the converter 1 consist of an outer metal casing with a ceramic lining or parts inside.

Figure 2:
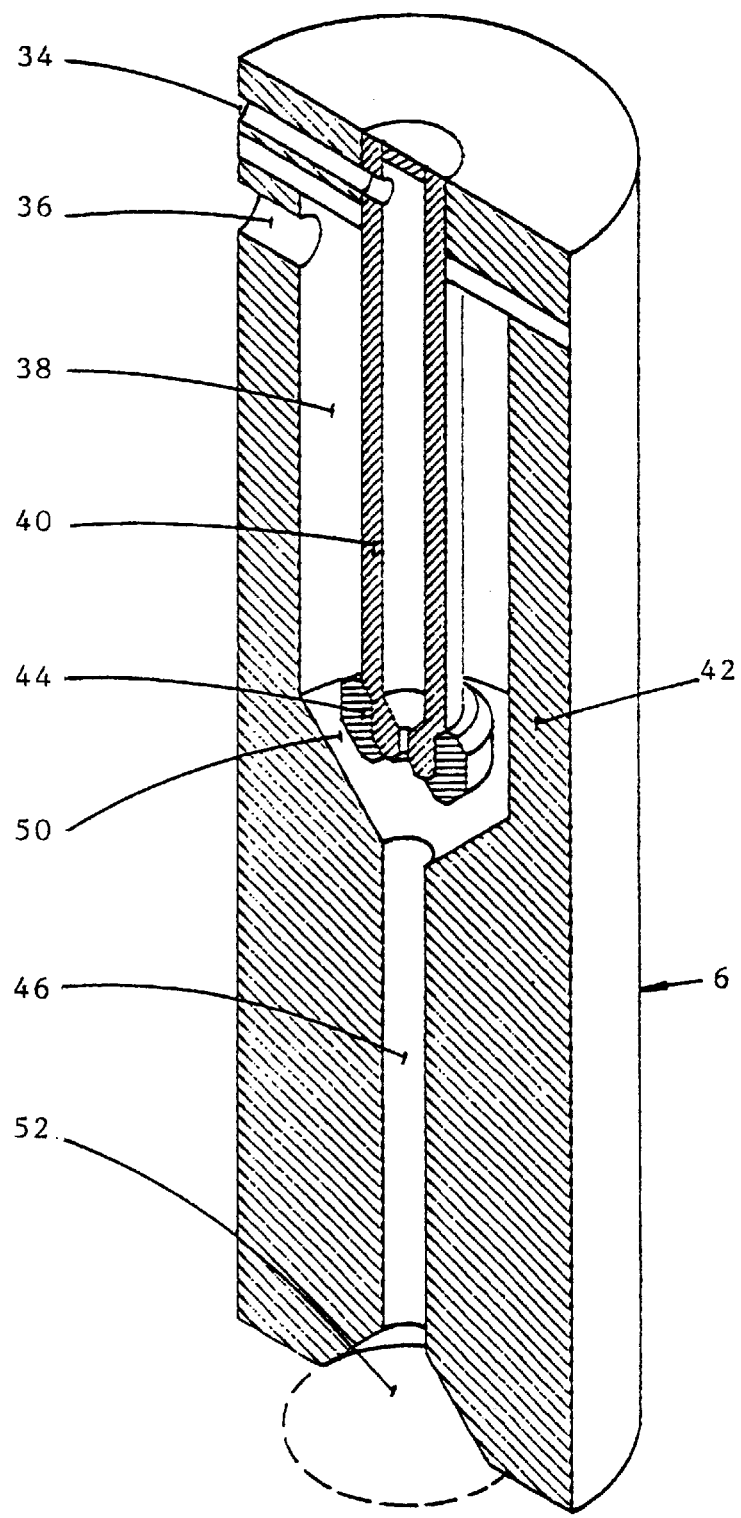

A charging unit, e.g., unit 6, is reproduced to enlarged scale in FIG. 2. The charging units 14 to 26 have identical construction, so that the following detailed description of charging unit 6 applies also to charging units 8 to 26. In the drawing, the feed duct 34 of the first reaction compound, for example, methane, is recognizable at the top; feed duct 36 for the second reaction compound, for example air, is shown thereunder. The second reaction compound is introduced into the casing-shaped intermediate space 38 between the charging needle 40 of the first reaction compound and the housing 42 of charging unit 6. Turbulence is produced by way of a restrictor 44 integrated into needle 40 or fastened otherwise, before the meeting of the two reaction compounds. The turbulence then propagates downwardly, as shown in FIG. 2, into a mixing channel 46 leading from the charging units 6, etc. and the reaction chamber 2. Channel 46 has a very much reduced cross-section relative to the cross-section of reaction chamber 2. Instead of restrictor 44, one or more other means can also be chosen to produce turbulence.

Figure 3:
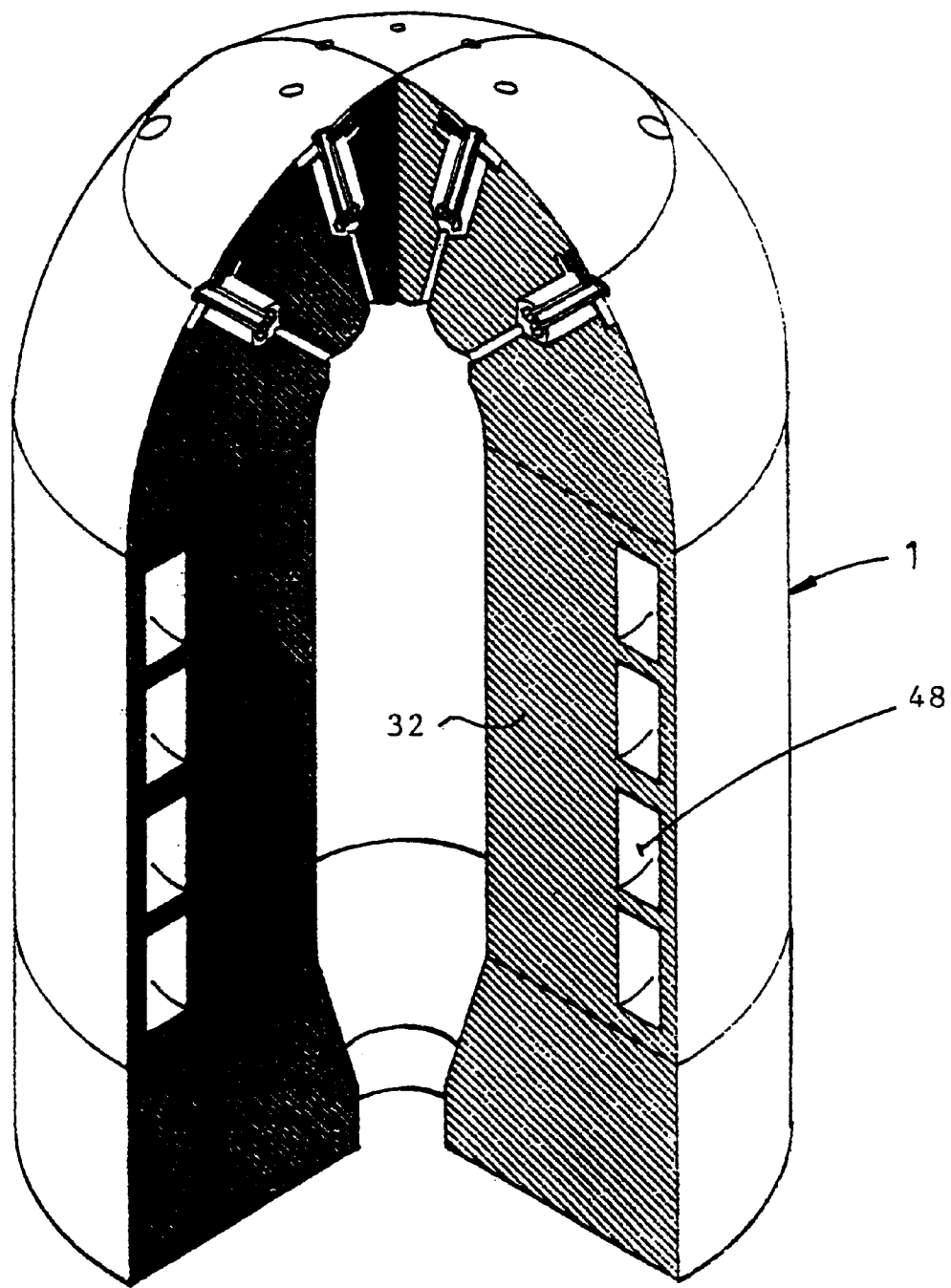

In FIG. 3, the converter 1 of FIG. 1 is shown to have preheating channels 48 in the main part 32. One or both reaction compounds can be preheated in these preheating channels 48, whereby the capability of reaction and readiness to react are increased. When preheated reaction compounds are fed to a charging unit 6, the turbulence must already exist before the reaction compounds mix.

Mixing channel 46, illustrated in FIG. 2, is a tubular channel with a corresponding surface structure. Such a tubular mixing channel, flowed through at high speed, is very simple to manufacture in terms of production technique. However, limits are imposed thereon in terms of flow technology. In place of the tubular mixing channel 46, other shapes are also possible. It is only necessary to ensure that the flow has a very high speed and that no regions are present within areas of turbulence or quiet zones, in which the speed of flow falls below that required. Such a slowing down of the flow would lead to a premature reaction, as described above.

The meeting of the two reaction compounds takes place in annular gap 50 (FIG. 2), which is flowed through at very high speed.

Figure 4:
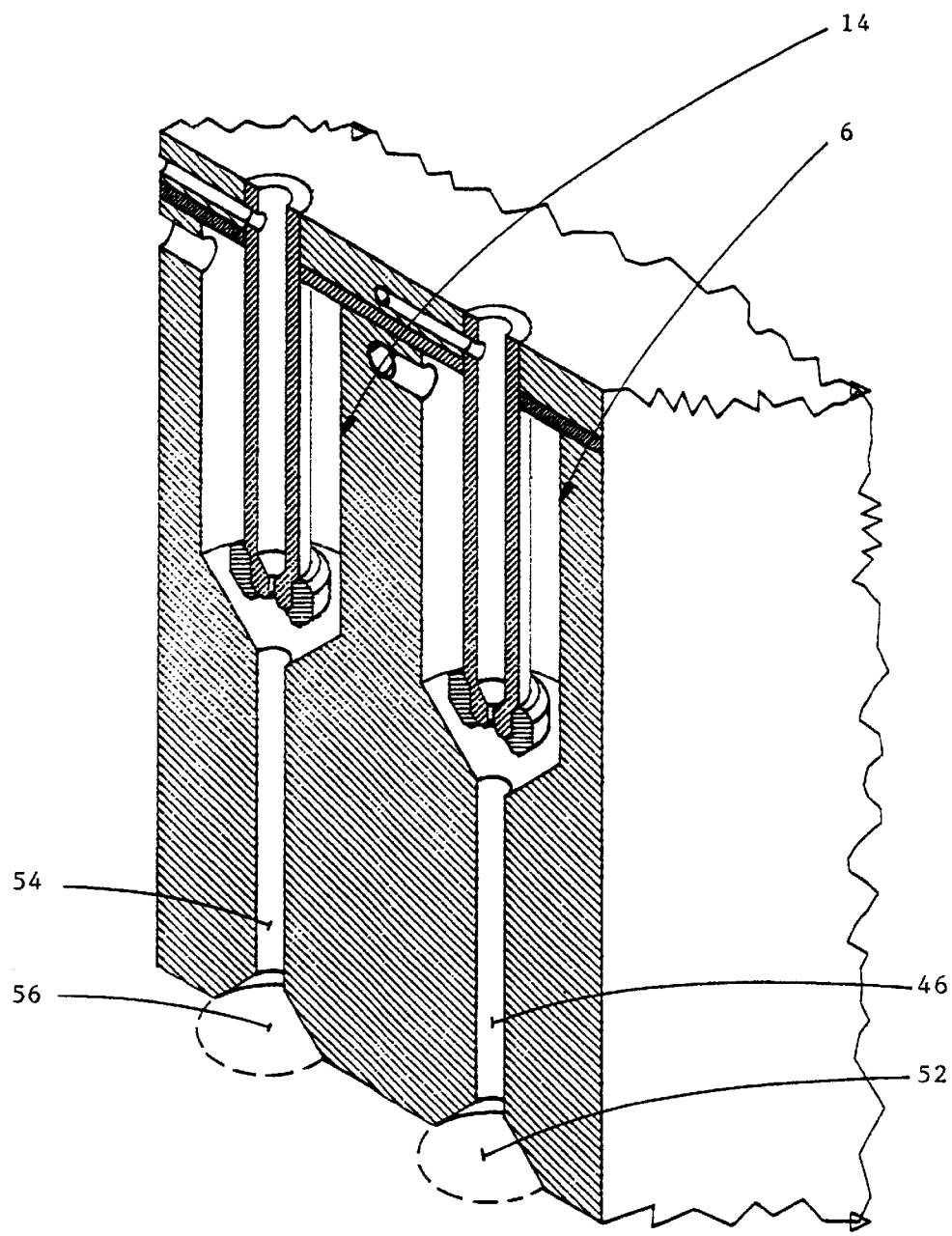

FIG. 4 shows the charging unit 6, the mixing channel 46, to be flowed through at very high speed, and the transition into reaction region 52, to be flowed through at a lower speed, for the reaction compounds of the first partial reaction, and a charging unit 14, mixing channel 54, to be flowed through at very high speed, and the transition into reaction region 56, to be flowed through at a lower speed, for the reaction compounds of the second partial reaction.

Figure 5:
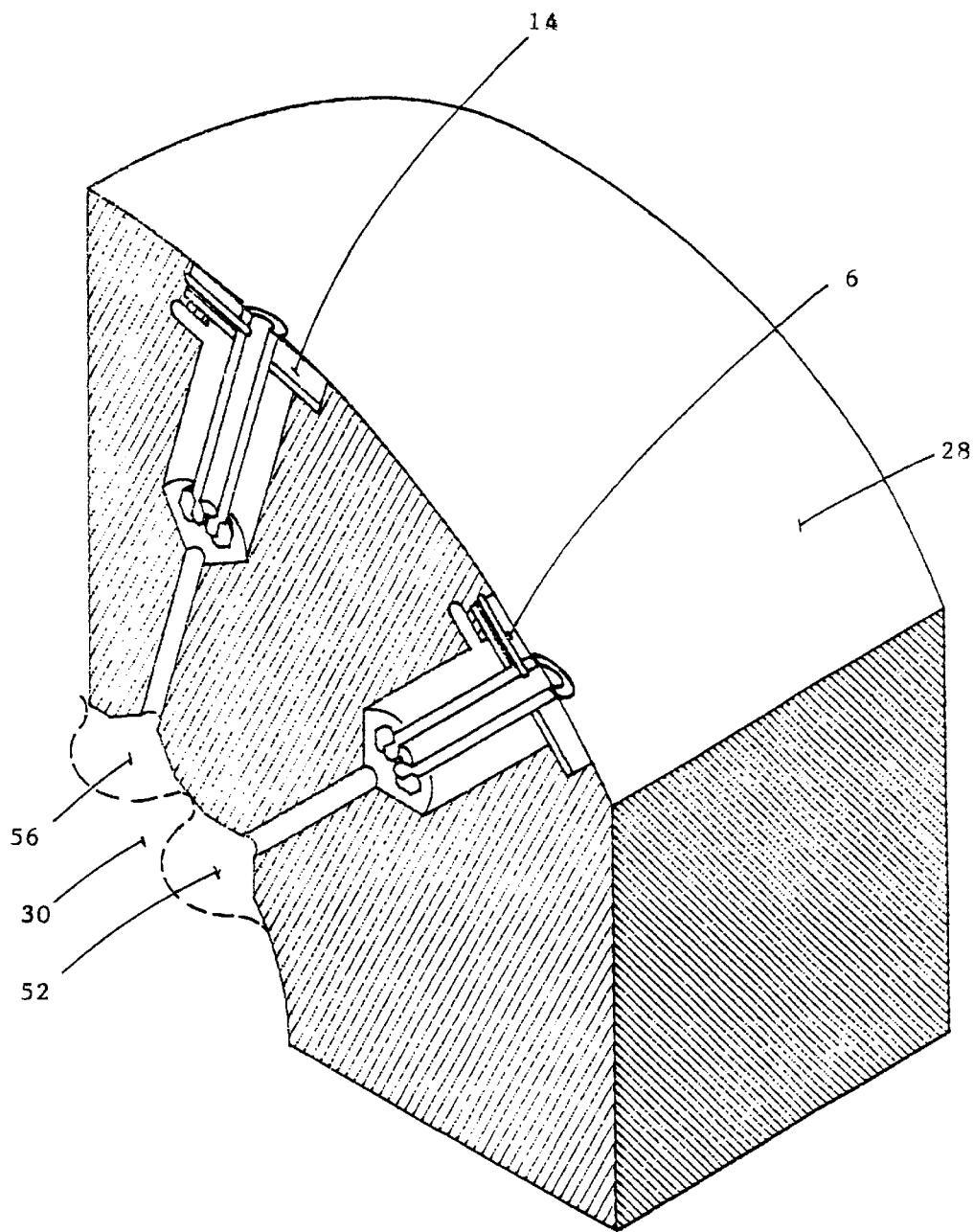

These two parallel charging units 6 and 14 can also be arranged at an angle of inclination relative to each other, as shown in FIG. 5. This arrangement favours the mixing of the two partial reactions to the main reaction. FIG. 5, like FIG. 1, shows two partial reaction regions 52, 56 of the first and second partial reactions. In this case, the partial reaction regions 52 and 56 are arranged so that they open in the form of a spherical segment into the main reaction region 30, to be flowed through at a lower speed. There is thereby a better superimposition and thus a better intermixing of the partial reactions, in the case of the main or conversion reaction. In this case, a focal point, in which the overall reaction predominantly takes place, forms in the main reaction region 30, to be flowed through at a lower speed.

Figure 6:
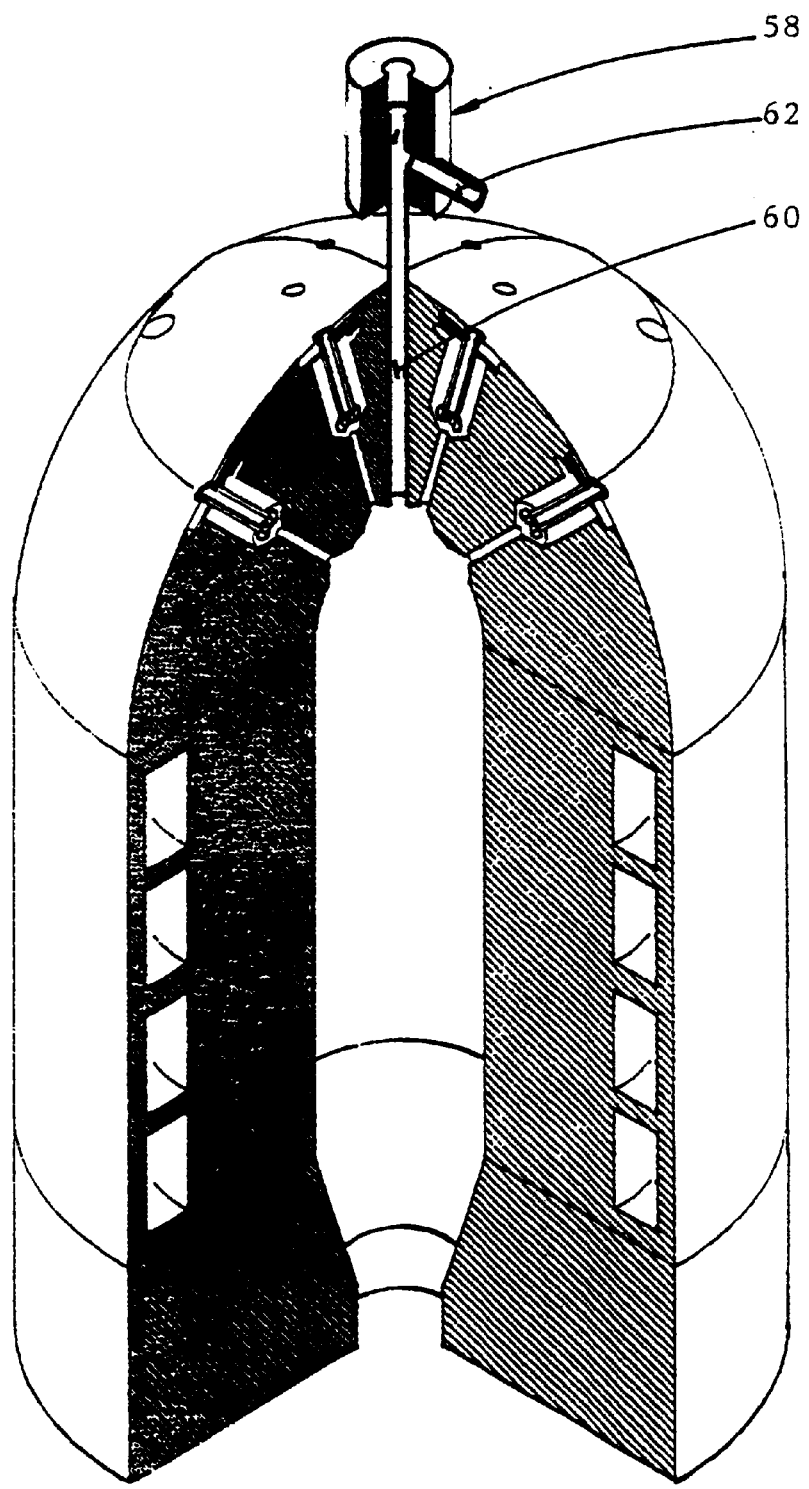

In FIG. 6, the converter 1 is reproduced with a pilot installation 58. The pilot installation 58 is connected with the main reaction chamber 2 by flow channel 60 and serves, by means of an ignition device (not shown), for the reliable ignition of the energy-supplying first gas mixture flowing in through charging units 6–12 when the converter is put into operation. The pilot installation 58 consists of a feed duct 62 for an ignition gas, an ignition chamber with at least one ignition device (not shown) and flow channel 60 opening into main reaction chamber 2.

During operation of the converter 1, pilot installation 58 can serve to remove gas from the reaction chamber 2 in order to continuously monitor the main reaction products. However, further reaction compounds participating in the main reaction can also be fed by way of pilot installation 58.

During operation of converter 1, constant stable conversion rates set in, which are extremely high in comparison with those technically possible in the past. At the same time, the expenditure of energy and outlay in apparatus are substantially smaller. This is the case also for the reason that the converter 1 has the smallest possible external surface, and thereby the lowest heat losses due to convection and radiation from its external surface.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a method of chemothermal conversion of feedstock in the form of fluid compounds or compounds convertible into a fluid state, into low-molecular, organic or inorganic compounds, said method comprising:

at least one first, preliminary step in which reaction compounds under excess pressure are caused to flow through a first mixing channel having a reduced flow cross-section, in which said compounds are completely intermixed to form an exothermic first mixture but are unable to inter-react within said first mixing channel;

at least one simultaneous, second preliminary step in which said feedstock, either alone or in a mixture with one or more other substances under excess pressure, is caused to flow through a second mixing channel having a reduced flow cross-section, in which said compounds are completely intermixed to form a second mixture but are unable to inter-react within said second mixing channel;

wherein compounds of said first preliminary step, downstream of said first mixing channel, and after reduction in flow speed produced by an increase in flow cross-section, flow into a reaction chamber, and perform an exothermic reaction with each other, still under excess pressure, at a very high reaction speed and very high energy density, dependent on said excess pressure, thereby creating a field of high temperature and heat radiation;

wherein compounds of said second preliminary step, downstream of said second mixing channel, and after reduction in flow speed produced by an increase in flow cross-section, flow into the same reaction chamber, and wherein the compounds of said second preliminary step then receive sufficient energy from the exothermic reaction of the compounds of the first preliminary step to react in such a way that the molecular structure of the compounds of said second preliminary step is completely destroyed;

the improvement comprising reaching an extremely high efficiency rate of the destruction of the compounds of the second preliminary step by introducing the compounds of said first preliminary step through at least one small mixing channel under excess pressure of between 1.5 atmospheres and 150 atmospheres, so that the start of the exothermic reaction is delayed until the compounds reach said main reaction chamber, wherein, due to the excess pressure, the compounds react very quickly in an explosion-like manner, thereby reaching a high temperature and high density of heat radiation immediately usable for the destruction of the molecular structure of the compounds of said second preliminary step, and introducing the compounds of said second preliminary step simultaneously with the compounds of said first preliminary step at the downstream end of the mixing channels of said first preliminary step where said exothermic reaction takes place, thus enabling the transfer of energy from the exothermic reaction of the compounds of said first preliminary step at a highest possible temperature and heat radiation level to the compounds of said second preliminary step.

2. The method according to claim 1, further comprising providing a plurality of mixing channels for the compounds of said first and second preliminary steps, to increase the surface of heat transfer between the exothermic reactions of the compounds of said first preliminary step with the compounds of said second preliminary step.

3. The method according to claim 2, wherein a partial reaction takes place in or at the end of the mixing phase.

4. The method according to claim 1, wherein said first mixture is a gas mixture of fuel and an oxygen carrier and said second mixture is a gas mixture of the feedstock and the same or a different fuel.

5. A converter for the chemo-thermal conversion of feedstock, said converter comprising:

a main reaction chamber with an outlet nozzle for reaction products;

at least one first charging unit for feeding a first gas mixture into said reaction chamber and at least one second charging unit for feeding a second gas mixture into said main reaction chamber, each said charging unit comprising means defining a plurality of feed ducts for the separate feeding of components of each respective mixture, and means defining a mixing channel connected with said main reaction chamber, said mixing channel serving as a mixing region for formation of a mixture of said feed components, the flow cross-section of said channel being selected to be so reduced in size that the speed of flow of the mixture in the mixing channel is greater than the speed of propagation of any reaction front of the components of the mixture therein, whereby flashback from said reaction chamber is prevented, and a plurality of first charging units arranged in a first circle on said head portion and a plurality of second charging units arranged on a second circle within said first circle.

6. The converter according to claim 5, wherein said reaction chamber comprises a body having a partly spherical head portion, said outlet nozzle being disposed at a portion of said body approximately opposite the head portion.

7. The converter according to claim 6, wherein said mixing channels extend within said partly spherical head portion substantially radial thereto, and the axes of said channels intersect approximately at a point of intersection within said reaction chamber.

8. The converter according to claim 5, further comprising a pilot device connected with said reaction chamber and operable to ignite the first mixture fed into said chamber.

9. The converter according to claim 8, wherein said pilot device comprises:

a feed duct;

an ignition chamber connected with said feed duct;

a flow channel connected with said ignition chamber and said reaction chamber, and an ignition device arranged within said ignition chamber.

10. The converter according to claim 8, wherein said pilot device is operable, after termination of the ignition of said first mixture, to extract gas from said reaction chamber for gas analysis.

11. The converter according to claim 5, wherein said reaction chamber comprises a metal casing provided with a ceramic lining or a ceramic part or parts.

12. A converter for the chemo-thermal conversion of feedstock, said converter comprising:

a main reaction chamber with an outlet nozzle for reaction products;

at least one first charging unit for feeding a first gas mixture into said reaction chamber and at least one second charging unit for feeding a second gas mixture into said main reaction chamber, each said charging unit comprising means defining a plurality of feed ducts for the separate feeding of components of each respective mixture, and means defining a mixing channel connected with said main reaction chamber, said mixing channel serving as a mixing region for formation of a mixture of said feed components, the flow cross-section of said channel being selected to be so reduced in size that the speed of flow of the mixture in the mixing channel is greater than the speed of propagation of any reaction front of the components of the mixture therein, whereby flashback from said reaction chamber is prevented, and further comprising preheating channels for preheating at least one gas present in said reaction chamber.

\* \* \* \* \*